United States Patent
Schweid et al.

(10) Patent No.: US 11,660,822 B2
(45) Date of Patent: May 30, 2023

(54) SYSTEM AND METHOD FOR IMPROVED INFILLING OF PART INTERIORS IN OBJECTS FORMED BY ADDITIVE MANUFACTURING SYSTEMS

(71) Applicants: Xerox Corporation, Norwalk, CT (US); Palo Alto Research Center Incorporated, Palo Alto, CA (US)

(72) Inventors: Stuart A. Schweid, Pittsford, NY (US); David A. Mantell, Rochester, NY (US); PriyaankaDevi Guggilapu, Webster, NY (US); David G. Tilley, Williamson, NY (US); Christopher T. Chungbin, Rochester, NY (US); Walter Hsiao, San Mateo, CA (US); Dinesh Krishna Kumar Jayabal, Rochester, NY (US); Daniel Cormier, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 91 days.

(21) Appl. No.: 17/157,568

(22) Filed: Jan. 25, 2021

(65) Prior Publication Data

US 2022/0234298 A1    Jul. 28, 2022

(51) Int. Cl.

| | |
|---|---|
| *B29C 64/393* | (2017.01) |
| *B33Y 30/00* | (2015.01) |
| *G06F 18/20* | (2023.01) |
| *G06F 18/2411* | (2023.01) |
| *B22F 10/22* | (2021.01) |
| *B29C 64/112* | (2017.01) |
| *G06N 3/004* | (2023.01) |
| *B22F 12/53* | (2021.01) |

(52) U.S. Cl.
CPC ............ *B29C 64/393* (2017.08); *B33Y 30/00* (2014.12); *G06F 18/2411* (2023.01); *G06F 18/295* (2023.01); *B22F 12/53* (2021.01); *G06N 3/004* (2013.01)

(58) Field of Classification Search
CPC ..... B29C 64/393; B29C 64/112; B33Y 30/00; B33Y 50/02; B33Y 10/00; G06K 9/6269; G06K 9/6297; B22F 12/53; B22F 10/22; B22F 10/38; B22F 10/85; G06N 3/004
USPC ......................................................... 700/110
See application file for complete search history.

(56) References Cited

U.S. PATENT DOCUMENTS

| | | | |
|---|---|---|---|
| 2015/0266235 A1 | 9/2015 | Page | |
| 2016/0237836 A1* | 8/2016 | Harris | ..................... B22F 10/20 |
| 2018/0104912 A1 | 4/2018 | Bastian et al. | |
| 2018/0229446 A1 | 8/2018 | Bastian et al. | |
| 2022/0332040 A1* | 10/2022 | Feinberg | ................ B33Y 70/00 |

* cited by examiner

*Primary Examiner* — Michael J Brown
(74) *Attorney, Agent, or Firm* — Maginot Moore & Beck LLP

(57) ABSTRACT

A slicer in a material drop ejecting three-dimensional (3D) object printer identifies the positions and local densities for a plurality of infill lines within a perimeter to be formed within a layer of an object to be formed by the printer. The local density of each infill line is filtered and a control law is applied to the filtered local density to identify an error in the local density compared to a target density. This process is performed iteratively until the error is within a predetermined tolerance range about the target local density. The error is used to generate machine ready instructions to operate the 3D object printer to achieve the target density for the infill lines.

17 Claims, 8 Drawing Sheets

SYSTEM AND METHOD FOR IMPROVED INFILLING OF PART INTERIORS IN OBJECTS FORMED BY ADDITIVE MANUFACTURING SYSTEMS

TECHNICAL FIELD

This disclosure is directed to three-dimensional (3D) object printers that form three-dimensional (3D) objects with ejected material drops or extruded material and, more particularly, to the infilling of the interiors in 3D objects manufactured with those printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject drops of melted materials, such as photopolymers or elastomers, while others extrude one or more ribbons of melted material. These printers typically operate one or more ejectors or extruders to form successive layers of thermoplastic material to form a three-dimensional printed object with a variety of shapes and structures. After each layer of the three-dimensional printed object is formed, the plastic material is cured so it hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. An uninsulated electrically conducting wire is wrapped around the chamber. An electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magnetohydrodynamic printer.

In these additive manufacturing systems, the perimeter of a layer is typically formed first and then the interior of the layer is filled with the melted material. The infill lines inside the perimeter are spaced at a distance that maintains a fixed density. As the infill material approaches the perimeter, the space between the infill lines and the perimeter can vary for different lines and the approach angles to the perimeter also change. These changes can cause the local density to fluctuate, which can lead to either excess material (local aberrations) or voids (structural weakness) occurring at the junctions between the perimeter and the infill lines. Sometimes attempts are made at filling areas that are larger than nominal areas, but typically for small areas the approach in extrusion printers is to leave voids between the ends of the infill lines at the perimeter. The ejection of discrete drops in the infill lines as the lines approach a perimeter can result in the drops being so far from one another that significant voids can occur near the perimeter. Voids in a part, particularly metal parts, are problematic because they can propagate cracks and lead to part failure.

An example of this issue is shown in FIG. 6 in which the area within a square perimeter is filled with infill lines. The infill lines in the middle of the object are shown with dashed lines and the infill lines closest to the perimeter are shown as dotted lines. The more interior lines are equally spaced from each other so their density is consistent at the portions that are further away from the perimeter. If the infill lines closest to the perimeter are printed at the locations shown in the figure, then the density of material near the perimeter exceeds the nominal part density. Similarly, if infill lines closest to the perimeter are omitted from the part, then voids occur near the left and right borders, which can cause part weakness. Being able to infill perimeters in parts produced with additive manufacturing printers without forming voids or excessive part density at the junction of the infill lines and perimeters would be beneficial.

SUMMARY

A new method of operating a material drop ejecting 3D object printer can infill perimeters in parts without forming voids or excessive part density at the junction of the infill lines and perimeters. The method includes identifying a perimeter to be formed in a first object layer of an object layer data model, identifying a position and a local density for a plurality of infill lines within the identified perimeter, adjusting the identified local density for each infill line in the plurality of infill lines, generating from the adjusted local density for each infill line machine-ready instructions to operate the 3D object printer to infill an interior of the perimeter in the first object layer with the plurality of infill lines, and executing the generated machine-ready instructions to operate the material drop ejecting 3D object printer to infill the interior of the perimeter in the first object layer of the object with the plurality of infill lines.

A new 3D object printer can infill perimeters in parts without forming voids or excessive part density at the junction of the infill lines and perimeters. The 3D object printer includes an ejection head having a nozzle that is configured to eject drops of material, a platform positioned opposite the ejection head, at least one actuator operatively connected to at least one of the platform and the ejection head, the at least one actuator being configured to move the platform and the ejection head relative to one another, and a controller operatively connected to the ejection head and the at least one actuator. The controller is configured to identify a perimeter to be formed in a first object layer of an object digital data model, identify a position and a local density for a plurality of infill lines within the identified perimeter, adjust the identified local density for each infill line in the plurality of infill lines, generate from the adjusted local density for each infill line machine-ready instructions to operate the 3D object printer to infill an interior of the perimeter in the first object layer with the plurality of infill lines, and execute the generated machine-ready instructions to operate the material drop ejecting 3D object printer to infill the interior of the perimeter in the first object layer of the object with the plurality of infill lines.

BRIEF DESCRIPTION OF THE DRAWINGS

The foregoing aspects and other features of a method of operating a 3D object printer and a new 3D object printer that infill perimeters in parts without forming voids or excessive part density at the junction of the infill lines and perimeters are explained in the following description, taken in connection with the accompanying drawings. The method and printer described below regulate the density of the infill lines as the lines approach a perimeter to achieve a more uniform density. The uniform density helps prevent irregularities at the layer perimeters, such as voids and excess deposition of material.

DETAILED DESCRIPTION

Figure 1:
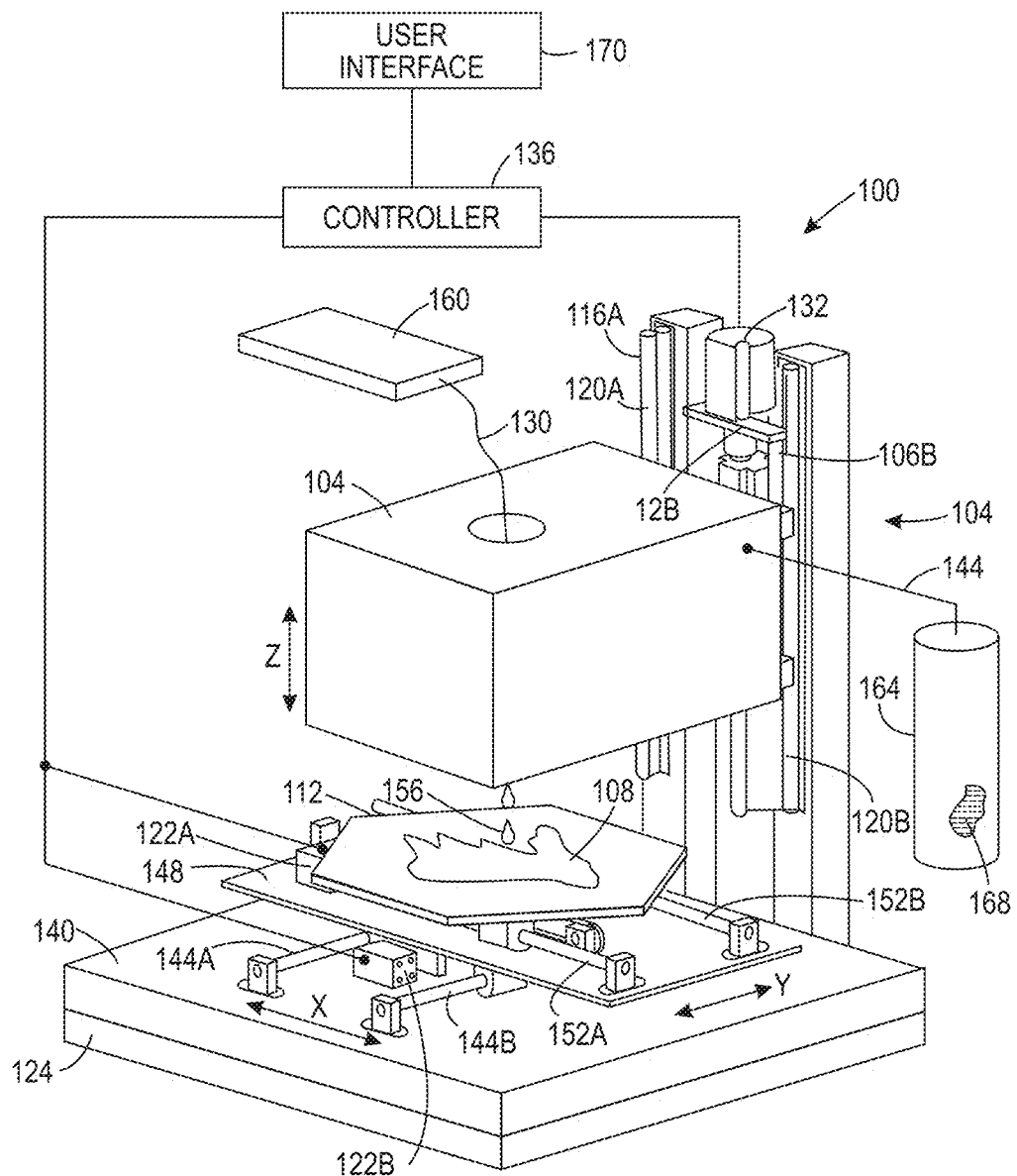
FIG. 1 depicts a metal drop ejecting 3D metal object printer that infills perimeters in parts without forming voids or excessive part density at the junction of the infill lines and perimeters.

For a general understanding of a 3D object printer and its operation that distributes quantization errors across the different layers of a perimeter in an additive manufactured part as well as for the details for the printer and its operation, reference is made to the drawings. In the drawings, like reference numerals designate like elements.

FIG. 1 illustrates an embodiment of a melted metal 3D object printer 100 in which a feedback controller is configured to iteratively adjust local density of an infill line as it approaches a perimeter to avoid excessive deposition of material or voids at the junctions of the infill lines and the perimeter. Although the description below is made with reference to the metal drop ejecting 3D object printer of FIG. 1, the feedback controller can be used with a single nozzle or multi-nozzle material drop ejecting 3D object printer or with an extrusion printer that ejects drops of non-metallic build materials.

In the printer of FIG. 1, the material deposition head 104 ejects drops of melted bulk metal from a single nozzle and drops from the nozzle form lines within layers of an object 108 on a platform 112. While the material deposition head is depicted as a melted metal drop ejecting head, it can be a single nozzle or multi-nozzle thermoplastic material drop ejector or a thermoplastic extruder. As used in this document, the term "bulk metal" means conductive metal available in aggregate form, such as wire of a commonly available gauge or pellets of macro-sized proportions. A source of bulk metal 160, such as metal wire 130, is fed into the ejection head and melted to provide melted metal for a chamber within the ejection head. An inert gas supply 164 provides a pressure regulated source of an inert gas 168, such as argon, to the chamber of melted metal in the ejection head 104 through a gas supply tube 144 to prevent the formation of metal oxide in the ejection head.

The ejection head 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejection head 104 to move the ejection head along the z-axis tracks 166A and 166B. The actuator 132 is operated by a controller 136 to maintain a distance between the single nozzle of the ejection head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejection head 104. Performing this X-Y planar movement of platform 112 as drops of molten metal 156 are ejected toward the platform 112 forms a line of melted metal drops on the object 108. Controller 136 also operates actuator 132 to adjust the vertical distance between the ejection head 104 and the most recently formed layer on the substrate to facilitate formation of other structures on the object. While the molten metal 3D object printer 100 is depicted in FIG. 1 as being operated in a vertical orientation, other alternative orientations can be employed. Also, while the embodiment shown in FIG. 1 has a platform that moves in an X-Y plane and the ejection head moves along the Z axis, other arrangements are possible. For example, the ejection head 104 can be configured for movement in the X-Y plane and along the Z axis.

The feedback controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejection head control signals output to the ejection head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, or the controller can access through a server or the like a remote database in which the digital data model is stored, or a computer-readable medium in which the digital data model is stored can be selectively coupled to the controller 136 for access. This three-dimensional model or other digital data model is processed by a slicer implemented with the controller to produce data identifying each layer of an object and then generate machine-ready instructions for execution by the controller 136 in a known manner to operate the components of the printer 100 and produce metal drop lines for formation of perimeter and infill lines in the metal object that correspond to the model. The generation of the machine-ready instructions can include the production of intermediate models, such as when a CAD digital data model for an object is converted into a STL object layer data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 136 executes the machine-ready instructions to control the ejection of the melted metal drops from the ejection head 104, the positioning of stage 148 and the platform 112, as well as the distance between the ejection head 102 and the uppermost layer of the object 108 on the platform 112. The feedback controller 136 is further configured to iteratively filter the local density of the infill lines as they approach perimeter lines to help ensure the density in those locations is consistent with the density of the infill lines at positions further away from the perimeter lines.

Figure 2:
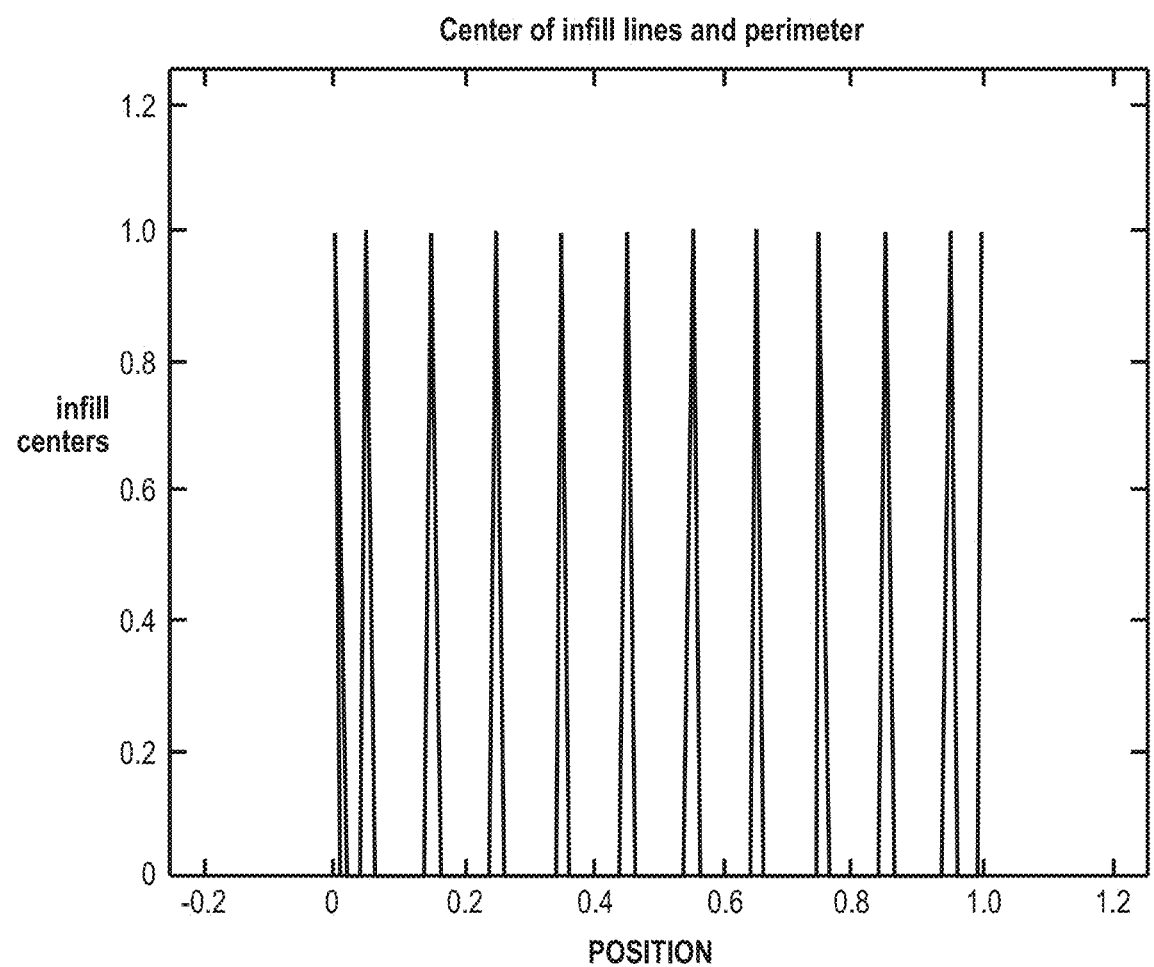
FIG. 2 is a graph of a pulse train for forming the infill lines of FIG. 6 at the y=0 line.
Figure 6:
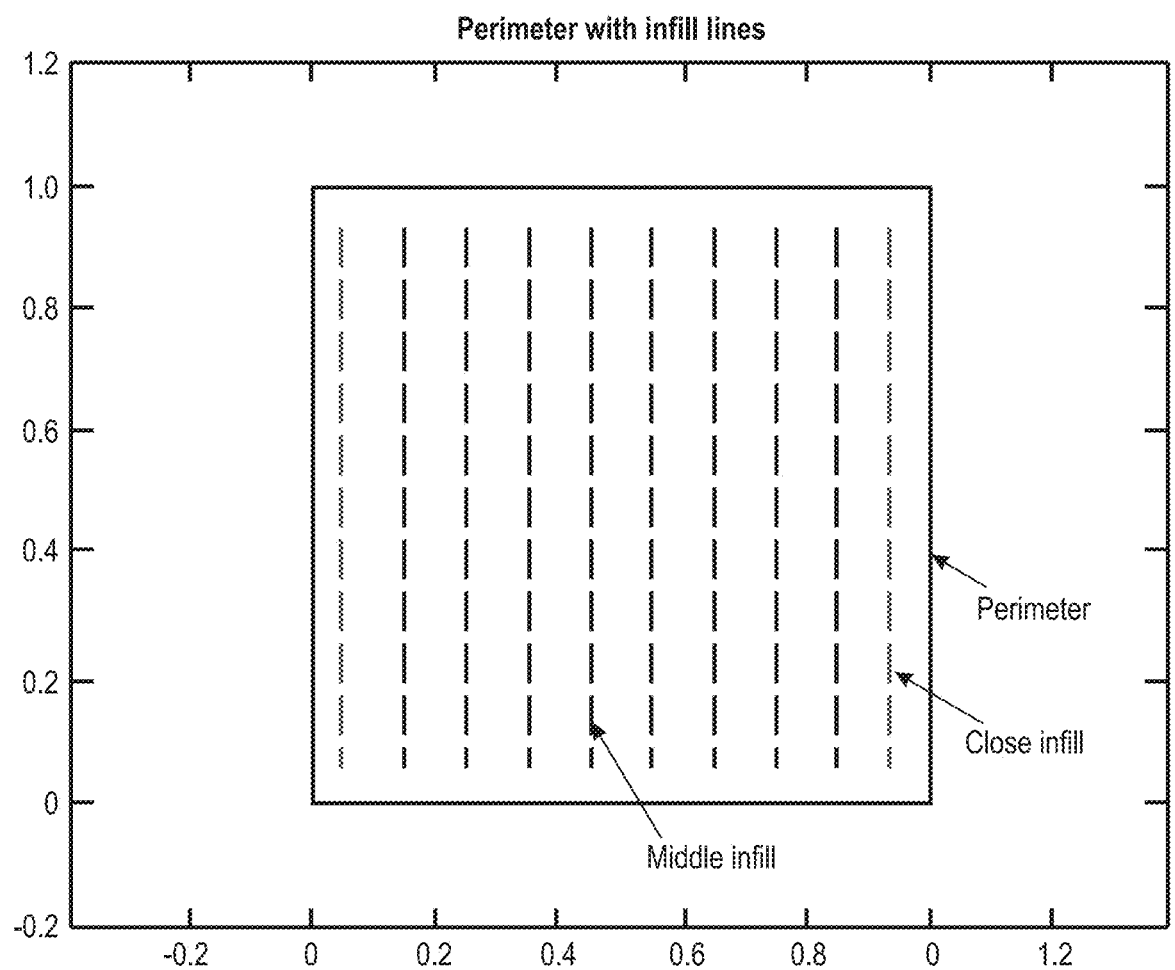
FIG. 6 is a prior art depiction of the placement of ten infill lines for an interior region within a perimeter.

To simplify the discussion of the local density regulation of the infill lines as they approach a perimeter line, a pulse train for forming a cross section of the infill lines of FIG. 6 along they position of 0 is shown in FIG. 2. If all lines, including lines 204 and 208 are formed, the infill and perimeter lines can be seen as a pulse train where all of the lines are equidistant except for the first and last lines, which are perimeter lines. To convert this pulse train to a local density estimate, a low pass filter is used. The low pass filter needs to have a flat response to the pulse train as being representative of a uniform area. Additionally, the filter needs to compact the infill lines at a distance of at most +/−2 times the distance between infill lines. This spacing helps ensure that the infill lines 204 and 208, which are closest to the perimeter, are properly placed so the distance between the perimeter line and the closest infill line is the same distance as the distance between adjacent infill lines further from the perimeter. Additionally, the domain of the filter is more than +/−the distance between infill lines to ensure that the infill lines that neighbor the perimeter and that also are separated by the distance between infill lines have a measured density that is lower than the density of the infills positioned at the proper spacing.

Figure 3A:
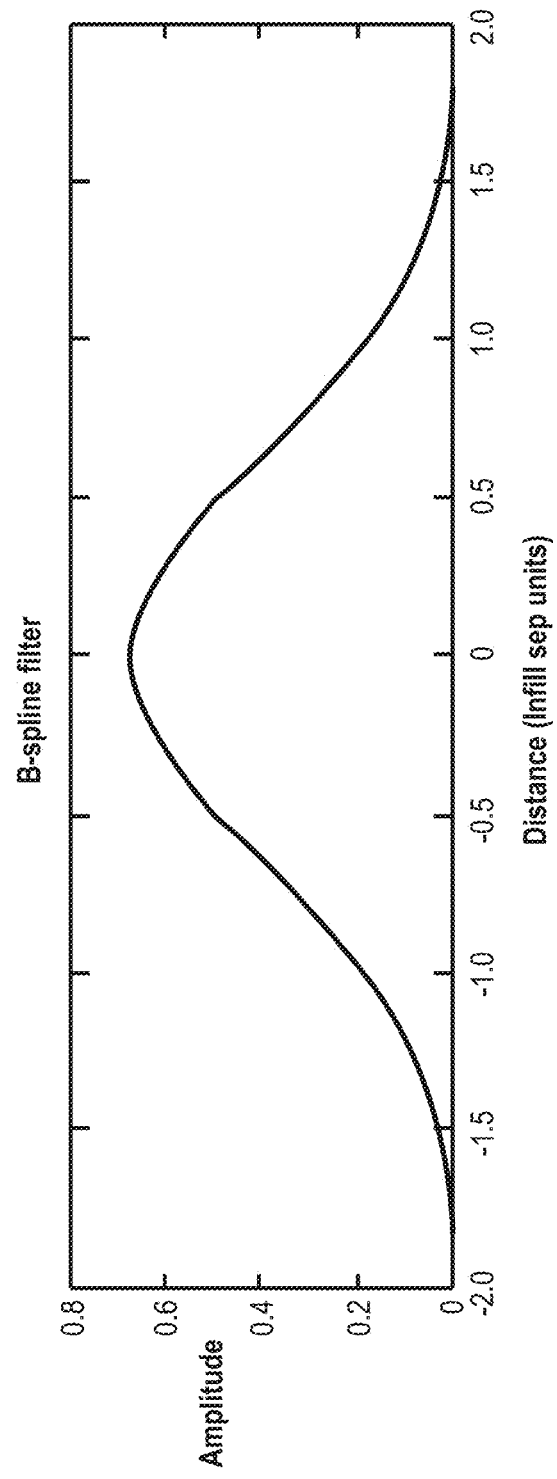
FIG. 3A depicts a B spline filter as a function of distance and FIG. 3B depicts the fast Fourier transform of the B spline filter.

Given that the support provided by the infill lines to adjacent infill lines needs to be more than +/−the distance separating the centers of the infill lines, that is the filter domain, be less than or equal to +/−2 times the infill center separation distances, and that the response to the filter be flat for a pulse train, a cardinal B-spline is used as an acceptable filter that meets all these requirements, although a low pass filter with a cutoff frequency below the line spacing frequency can be used. The only cardinal B-spline choices are a quadratic B-spline and cubic B-spline. The cubic B-spline, shown in FIG. 3A, is continuous to enable a smooth response. The filter can be generated by convolving a rectangular function with itself four times. This type of generation ensures a $4^{th}$ order zero at the pulse train frequency.

Figure 3B:
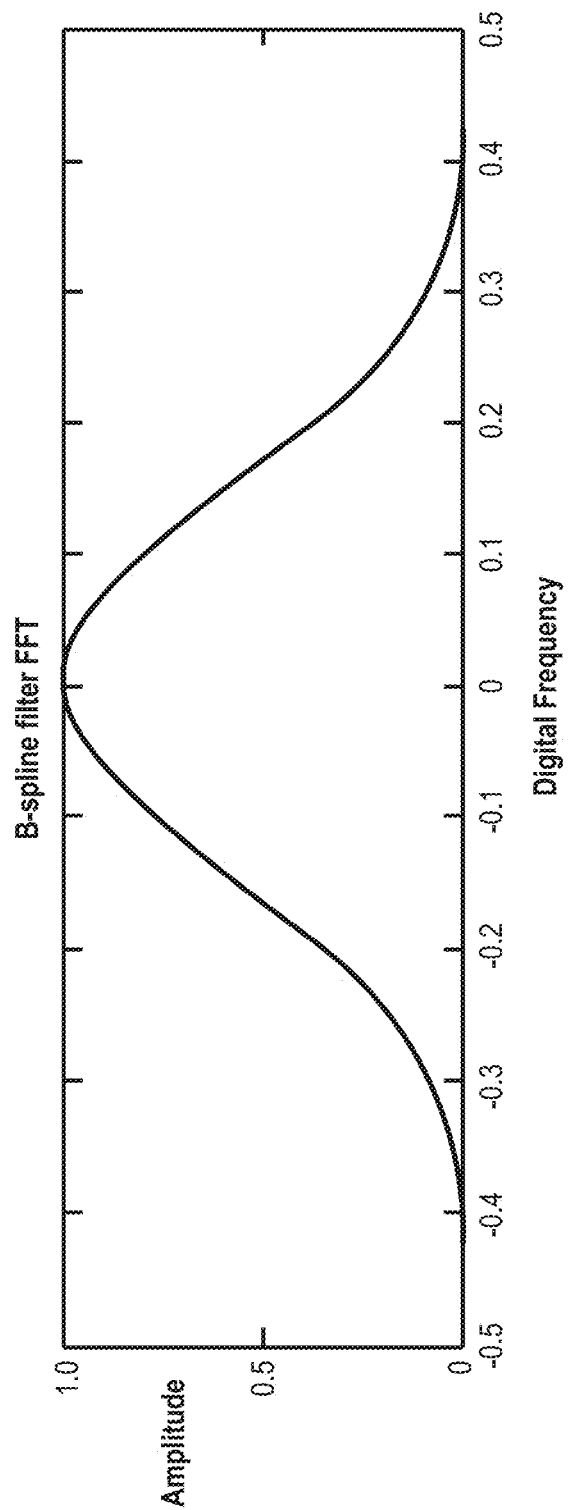
Figure 4A:
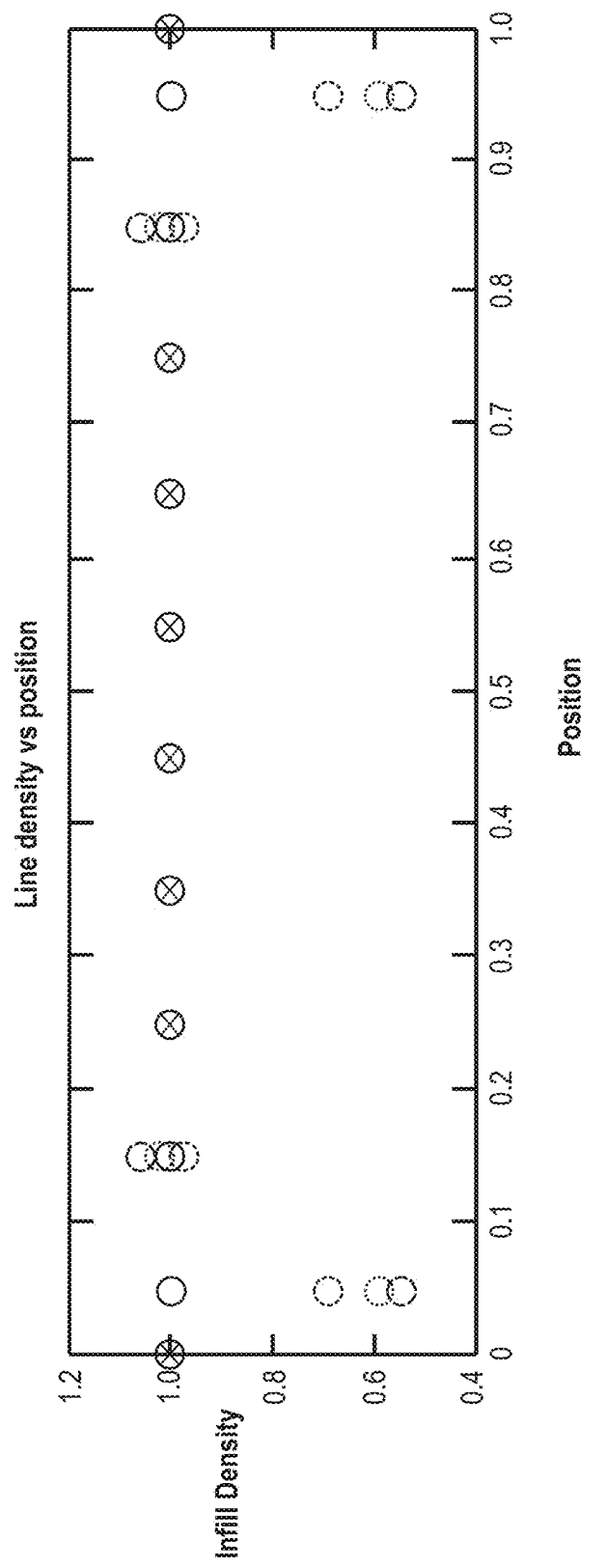
FIG. 4A depicts four iterations of the line densities of the infill lines as a function of position and FIG. 4B depicts the iterations of the local density of the infill lines as a function of position.
Figure 4B:
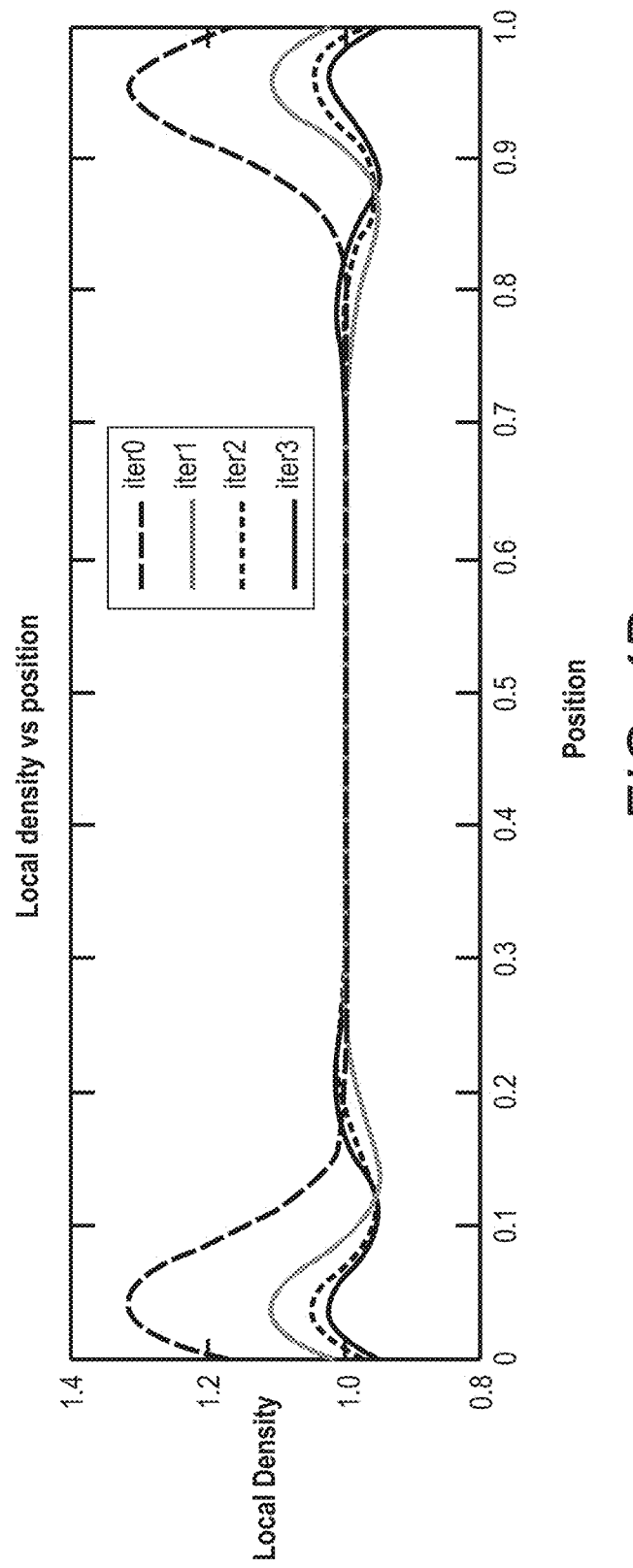

In the graph of FIG. 4A, the infill line density for the infill lines as function of position are shown and the graph of FIG. 4B shows the corresponding local density estimate for the infill lines as a function of position. The local density estimate is generated by filtering the local density estimate for a weighted pulse train with the B-Spline filter noted above. The weighting of the pulse train is made using the expected drop mass changes versus the changes in drop ejection frequency during acceleration and deceleration of the ejection head during the printing of the lines. When all the infill densities are the same, which is the initial state, that is, iteration 0 as shown in FIG. 3B, the response is flat in the middle but increases near the perimeter to a value of about 1.3 times the nominal density due to the overlap of the infill and perimeter lines. In order to reduce the high density area at these positions, the density of the infill lines near the perimeter must be reduced.

To perform this density reduction, the controller 136 is configured as a feedback controller to modify the infill density values at each of the ten locations for the infill lines in the example being discussed. Negative feedback is used to update the density of each location using the local density measure at that location, which is the infill line density convolved with the B-spline filter, as the measured signal for the controller. At each infill line location, which is ten in the current example, the local density of the infill line is modified using the following control law:

$$\text{local\_density}(k) = \text{conv}(\text{line\_density}, B\text{-spline filter})$$

$$\text{line\_density}(k+1,j) = \text{line\_density}(k+1,j) - \text{gain}^*(\text{local\_density}(k,j) - \text{target})$$

where k is the iteration number and j is the infill line number. The iteration number k can be provided from the user interface 170 as a parameter for the slicer prior to the slicer processing the digital model data. In an alternative embodiment, the iteration number k is determined using the "difficulty" of the features in the layer. As used in this document, the term "difficulty of the features" means a number of toolpath segments for forming a perimeter of a layer exceeding a predefined threshold or a number of direction changes along a toolpath for forming the perimeter of a layer exceeding a predefined threshold. For example, the number of toolpath segments for forming the perimeter of a rectangular layer is four, while the number of toolpath segments for forming the perimeter of an octagon is eight. A threshold of five identifies the octagon as a "difficult" layer warranting a higher number of iterations. In this example, the gain is set to 1.0 and the target set to 1.0. The term "target" as used in this document means the target density of the infill line, which in this example is 1.0 drops per $mm^2$. As used in this document, the term "control law" means the mathematical equation for a closed loop controller that determines how to update the commanded values to the system given previous output values to the system. In the closed loop controller being disclosed, the output values are the 3D localized drop rate and the measured output is the predicted local density. The gain determines how quickly the system converges to the optimal drop rate to be commanded to the system. A gain that is less than 1.0 requires many iterations and too much time to reach the optimal rate. Increasing the gain can speed up the rate of convergence but may lead to instability, and in some cases, may not converge at all. In a linear single-input, single-output (SISO) system, the control law for line_density(k+1,j) results in a dead beat controller.

Referring again to FIG. 4B, the local density at position 0.05 for iteration 0 is approximately 1.3. Thus, the error at position 0.05 is 0.3 (1.3−1) and so using the PI (Proportional Integral) control law for line_density(k+1,j) with the gain=1.0 sets the line density at position 0.05 to 0.7 for the next iteration, that is, iteration 1. The feedback loop control iterations are repeated until near steady state, which occurs in very few iterations, such as three in the present example. After iterations 2 and 3, both the mean error and variation in density near the perimeter is greatly decreased as can be viewed in FIG. 4B.

While the present example is for a complete infill line in a one dimensional analysis, the methodology can easily be extended to two dimensions and is performed on a point by point basis, when overlayed on a fixed grid, instead of once per infill line. The estimation by requiring a two-dimensional filtering step. The cardinal B-Spline filter described in the example above is extended to two-dimensions by generating a circular symmetric version, i.e., B-spline$_{2d}$(x, y)=B-spline$_{1d}$((x$^2$+y$^2$)$^{0.5}$). The circular symmetric property allows the filter to function identically regardless of the infill line angles so the response of the system becomes rotationally invariant.

At each point of the infill, not for the whole infill line alone, the two equations used above are applied globally and independently. The filtering step ensures that spatial information flows from one pixel to another and the proper choice of a filter, such as the B-spline filter noted above, guarantees that the updates of infill for close pixels are very similar. This smooth response helps maintain control law stability even though several control laws are interacting and being processed independently.

Limits to the drop spacing must be considered in the output. Drops that are too close may not lie flat and can lift off the surface if printed too slowly. Drops that are too far apart may not form a thin continuous line and leave gaps that can become voids in the final part. In an embodiment in which the nominal drop mass is ~1.5 gm/10,000 drops and the nominal infill drop spacing is 0.5 mm, a typical range of drop spacing of about 0.2 mm to about 0.75 mm is used to limit the output of the filtering. As used in this document, the term "drop spacing" means a predefined distance between the centers of adjacent drops ejected as an ejector moves along a path in a layer.

Though the filter limits significantly improve uniformity in the infill lines, local spots of non-uniformity can still appear. Though more iterations might reduce the number of spots of non-uniformity, the returns for the extra processing are minimal. This issue arises most often in regions where the angle between the infill lines and the perimeter are the greatest. Essentially, a gap occurs where a pair of neighboring infill lines meets the perimeter. To mitigate this non-uniformity, additional toolpath data can be filtered. For example, the perimeter can be included with the infill lines for filtering. The perimeter can be included with the infill lines by filtering the perimeter as an additional toolpath for the ejector along with the infill lines in the same manner as noted above. For adjusting a local density of an outer perimeter, the direction of the filtering is inward toward the infill lines only. All other parts of the process discussed previously for modification of the local density of the perimeter remain identical. One way to accomplish this additional filtering is to form an inner perimeter and filter that inner perimeter along with the infill lines. The filtering is achieved by applying the two-dimensional B-spline to the inner or outer perimeter, if no inner perimeter is necessary. In addition to the filtering of the infill lines, iteration is used to improve the uniformity of the area covered by the perimeter as well as the infill lines. Typically, the perimeter drop spacing is reduced to fill the gaps where the infill lines are not close enough to the outer perimeter. Typically, a strong trade-off occurs between reducing drop spacing at the ends of an outer perimeter and an inner perimeter so the majority of the improvement is obtained by filtering the infill lines initially. Then small improvements are obtained by filtering the inner perimeter. In some scenarios, an inner perimeter does not need to be generated, as where the spacing between the outer perimeter and the infill lines is less than twice the spacing between infill lines. In non-metallic object printers, the slicers simply leave an empty interior since the outside surface is the main attribute of merit, but in a metal object drop printer, users want the interior portions of the part features to be as close to fully dense to the outer perimeter as possible. To accomplish this goal, an interior path is added and filtered as already noted and those portions where the drop spacing falls within the limit of maximum drop spacing are kept.

While filtering is the way the rules of drop spacing and infill line formation were developed as discussed above, the output can be used to derive rules that can be used for implementation. Because filtering is used to a limited extent, the rules need only consider regions that look at infill perimeter combinations that span the total extent of the influence achieved in the multiple filtering steps. A range of specific cases can be generated with various combinations of perimeter and infill configurations to examine the output systematically. Alternatively, a large number of parts/layers can be sliced and filtered using a learning algorithm to produce the rules for local density regulation. These rules can be determined for the drop spacings and then iterated based on filtered output for further optimization.

Figure 5:
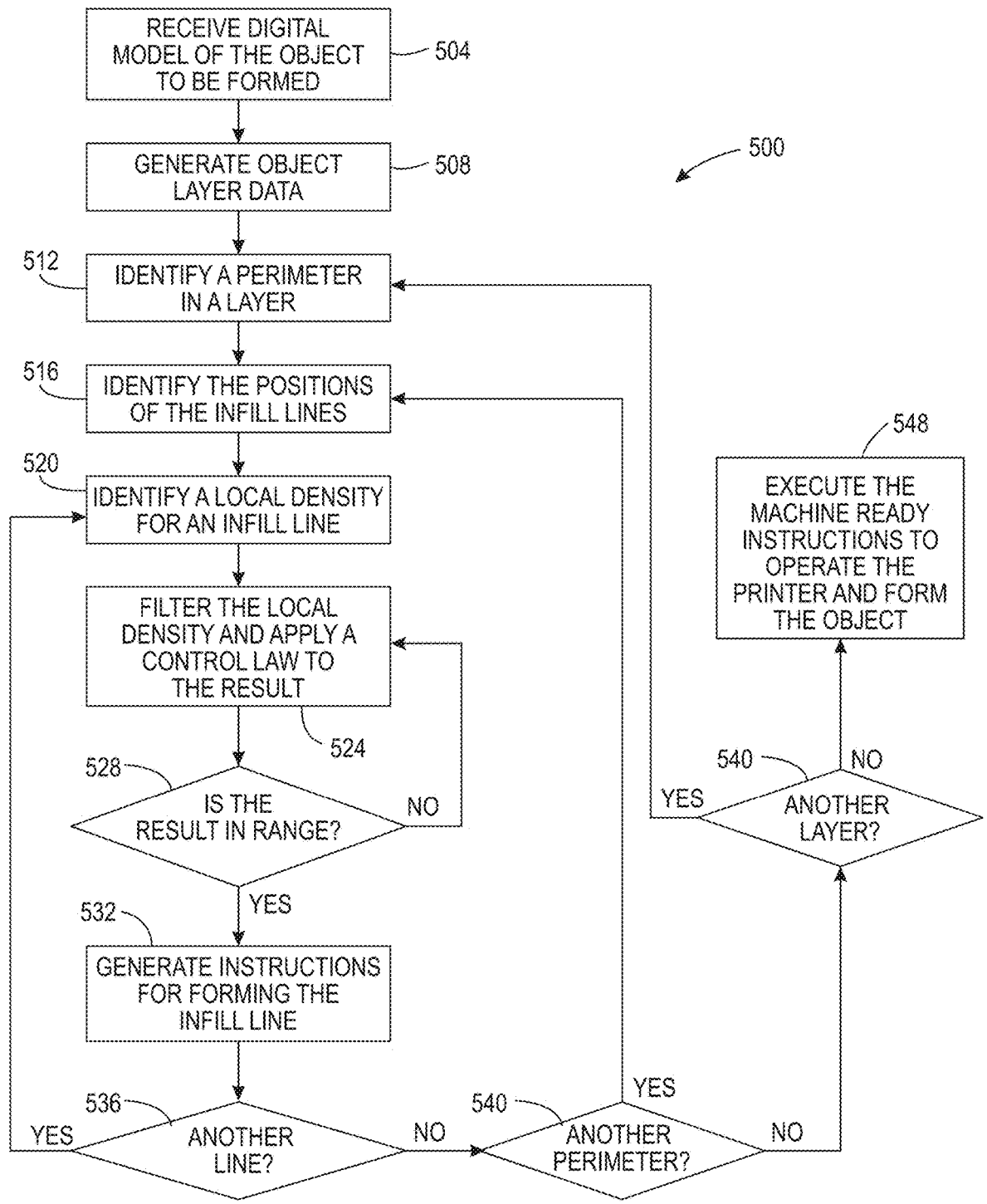
FIG. 5 is a flow diagram of a process implemented by a feedback controller in the printer of FIG. 1 to regulate the local density of infill lines.

A process for operating a material deposition 3D object printer to regulate the infilling of perimeters by iteratively determining local density of each infill line in a layer is shown in FIG. 5. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 5 is a flow diagram of a process that operates a material drop ejecting 3D object printer, such as printer 10, to regulate local density of infill lines within a perimeter. The process 500 begins with the slicer receiving the digital data model for the object to be produced (block 504). The slicer then generates object layer data (block 508). For the first layer, the slicer identifies a perimeter to be formed in the layer (block 512). The positions of the infill lines are then identified (block 516) and a local density is identified for each infill line (block 520). The local density for each infill line is filtered and a control law is applied to the filtered local density to identify an error in the filtered local density (block 524). The error in the filtered local density is compared to a predetermined range about a target local density and if the error in the filtered local density is within the predetermined range about the target local density (block 528), then machine-ready instructions for operating the printer to form the infill line in the layer are generated and stored (block 532). If another infill line is to be processed (block 536), the local density for the infill line is identified (block 520) and the local density is filtered and processed with the control law until it is within the predetermined range (block 524 through 532) so the machine-ready instructions are generated for forming the infill line (block 536). Once all of the infill lines for the perimeter have been processed and the corresponding machine-ready instructions generated, the process determines if another perimeter within the layer is to be processed (block 540) so the machine ready instructions for the infill lines within the perimeter are generated. Once all of the infill lines for all of the perimeters in the layer have been processed, the process continues for each of the remaining layers (block 544) until all of the layers of the object layer data have been processed. After all of the layers have been processed, the controller of the printer executes the machine-ready instructions to form the object (block 548).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional (3D) object printer comprising:
    an ejection head having a nozzle that is configured to eject drops of material;
    a platform positioned opposite the ejection head;
    at least one actuator operatively connected to at least one of the platform and the ejection head, the at least one actuator being configured to move the platform and the ejection head relative to one another; and
    a controller operatively connected to the ejection head and the at least one actuator, the controller being configured to:
        identify a perimeter to be formed in a first object layer of an object digital data model;
        identify a position and a local density for a plurality of infill lines within the identified perimeter;
        filter a pulse train to be used to form the plurality of infill lines to identify a local density for each infill line in the plurality of infill lines;
        apply a control law to the identified local density to identify an error for the identified local density;
        using the identified error to adjust the identified local density for each infill line in the plurality of infill lines;
        generate from the adjusted local density for each infill line machine-ready instructions to operate the 3D object printer to infill an interior of the perimeter in the first object layer with the plurality of infill lines; and
        execute the generated machine-ready instructions to operate the material drop ejecting 3D object printer to infill the interior of the perimeter in the first object layer of the object with the plurality of infill lines.

2. The 3D object printer of claim 1, the controller being further configured to:
    adjust a local density of a perimeter adjacent to at least a portion of the plurality of infill lines.

3. The 3D object printer of claim 2, the controller being further configured to:
    adjust the local density of the perimeter after the local density of the plurality of infill lines is adjusted.

4. The 3D object printer of claim 1, the controller being further configured to identify the error for the identified local density for each infill line by:
    continuing the filtering of the pulse train and the application of the control law to the identified local density for a predetermined number of iterations.

5. The 3D object printer of claim 4 wherein the predetermined number of iterations is provided prior to identifying a position and a local density of a plurality of infill lines.

6. The 3D object printer of claim 5 wherein the number of iterations is determined using a difficulty of features of the first object layer.

7. The 3D object printer of claim 1, the controller being further configured to:
    weight the pulse train prior to filtering the pulse train.

8. The 3D object printer of claim 7, the controller being further configured to:
    weight the pulse train using an expected change in drop mass versus a change in ejection frequency occurring during acceleration and deceleration of the ejection head.

9. The 3D object printer of claim 1, the controller being further configured to identify the error for the identified local density for each infill line by:
    continuing the filtering of the pulse train and the application of the control law to the filtered local density until the identified error for the identified local density is within a predetermined range about a target local density.

10. The 3D object printer of claim 1, the controller being further configured to filter the pulse train by convolving the pulse train with a low pass filter having a cutoff frequency that is less than a line frequency of the infill lines.

11. The 3D object printer of claim 1, the controller being further configured to filter the pulse train by convolving the pulse train with a cardinal cubic B-spline function.

12. The 3D object printer of claim 11 wherein the cardinal B-spline function is a circular symmetric B-spline function defined by applying $((x^2+y^2)^{0.5})$ to a one-dimensional B-spline function.

13. The 3D object printer of claim 1, the control law being defined as:
    line_density(k+1,j)=line_density(k+1,j)−gain*(local_density(k,j)−target), where k is a number of times the control law has been applied previously to the convolved local density, j is a number identifying the infill line in the plurality of infill lines, local_density (k,j) is the convolved local density, target is the target density measured in drops per $mm^2$, and gain is a number between 0.5 and 1.5.

14. A three-dimensional (3D) object printer comprising:
an ejection head having a nozzle that is configured to eject drops of material;
a platform positioned opposite the ejection head;
at least one actuator operatively connected to at least one of the platform and the ejection head, the at least one actuator being configured to move the platform and the ejection head relative to one another; and
a controller operatively connected to the ejection head and the at least one actuator, the controller being configured to:
    identify a perimeter to be formed in a first object layer of an object digital data model;
    identify a position and a local density for a plurality of infill lines within the identified perimeter;
    adjust the identified local density for each infill line in the plurality of infill lines;
    generate from the adjusted local density for each infill line machine-ready instructions to operate the 3D object printer to infill an interior of the perimeter in the first object layer with the plurality of infill lines; and
    execute the generated machine-ready instructions to operate the material drop ejecting 3D object printer to infill the interior of the perimeter in the first object layer of the object with the plurality of infill lines.

15. The 3D object printer of claim 14, the controller being further configured to:
    adjust a local density of a perimeter adjacent to at least a portion of the plurality of infill lines.

16. The 3D object printer of claim 15, the controller being further configured to:
    adjust the local density of the perimeter after the local density of the plurality of infill lines is adjusted.

17. The 3D object printer of claim 14, the controller being further configured to adjust the identified local density of each infill line by:
    identifying an error for the identified local density for each infill line; and
    adjusting the identified local density for each infill line using the identified error.

* * * * *